United States Patent
Furukawa et al.

(10) Patent No.: US 8,503,579 B2
(45) Date of Patent: Aug. 6, 2013

(54) CHANNEL ESTIMATOR

(75) Inventors: Tatsuhisa Furukawa, Kanagawa (JP);
Hidehiro Matsuoka, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 351 days.

(21) Appl. No.: 12/834,189

(22) Filed: Jul. 12, 2010

(65) Prior Publication Data

US 2011/0051863 A1    Mar. 3, 2011

(30) Foreign Application Priority Data

Aug. 28, 2009  (JP) ................................ 2009-198735

(51) Int. Cl.
*H04B 1/10*  (2006.01)
*H04L 27/00*  (2006.01)

(52) U.S. Cl.
USPC .......................................... 375/340; 375/343

(58) Field of Classification Search
USPC ..................... 375/340, 343, 149, 147, 316
See application file for complete search history.

(56) References Cited

U.S. PATENT DOCUMENTS

| | | | | |
|---|---|---|---|---|
| 6,577,676 | B1 * | 6/2003 | Hashimoto | 375/152 |
| 6,914,932 | B1 * | 7/2005 | Miya et al. | 375/150 |
| 2002/0122463 | A1 * | 9/2002 | Li | 375/140 |
| 2003/0235238 | A1 * | 12/2003 | Schelm et al. | 375/148 |
| 2008/0049600 | A1 * | 2/2008 | Liu | 370/208 |
| 2009/0010343 | A1 * | 1/2009 | Teng | 375/259 |
| 2009/0135977 | A1 * | 5/2009 | Sheu | 375/371 |
| 2010/0329405 | A1 * | 12/2010 | Chen et al. | 375/371 |
| 2011/0002418 | A1 * | 1/2011 | Chen et al. | 375/340 |
| 2011/0013731 | A1 * | 1/2011 | Chen et al. | 375/343 |

OTHER PUBLICATIONS

Naoyuki Oda, Hiroshi Harada, Iwao Sasase and Yoshihiro, "Performance Analysis of a Multi-code CDM Transmission Scheme Based on Cyclic Extended Spread Code as an Extension of 3rd Generation CDMA System", Keio University, Tokyo, Japan, 1997, IEEE.*
Kazuyuki Shimezawa, Hiroshi Harada, and Hiroshi Shirai, "Cyclic Shifted-and-Extended Codes Based on Almost Perfect Autocorrelation Sequences for CDM Transmission Scheme", Chuo University, Tokyo, Japan, 2004, IEEE.*
Ji Hwan Choi, Hyun Kyu Chung*, Hyunseok Lee, Jongsub Cha, and Hyuckjae Lee, "Code-Division Multiplexing based MIMO Channel Sounder with Loosely Synchronous Codes and Kasami Codes", School of Engineering, Information and Communications University, Korea, IEEE 2006.*
Byoung-Jo Choi and Lajos Hanzo,"On the Design of LAS Spreading Codes", University of Southampton, UK, IEEE 2002.*

(Continued)

*Primary Examiner* — Aristocratis Fotakis
(74) *Attorney, Agent, or Firm* — White & Case LLP

(57) ABSTRACT

The channel estimator includes a plurality of correlating sections configured to calculate a plurality of time correlation values between the signal and a plurality of known pattern signals having different code lengths, an analyzing section configured to output a control signal representing a selected period for extracting a preferable correlation output from the output from each of the plurality of correlating sections, and a delay profile generating section configured to output a delay profile obtained by adaptively selecting or combining parts of the outputs from the plurality of correlating sections based on the output from the analyzing section.

18 Claims, 10 Drawing Sheets

OTHER PUBLICATIONS

Slawomir Stanczak, Holger Boche and Martin Haardt, "Are LAS-codes a miracle ?", Germany, IEEE 2001.*

Japanese Office Action for Japanese Application No. 2009-198735 mailed on Jan. 31, 2012.

Liang, Weiqiang, "A Robust and Adaptive Carrier Recovery Method for Chinese DTTB Receiver", IEEE, 2008, pp. 146-151.

Liu, et al. ITD-DFE Based Channel Estimation and Equalization in TDS-OFDM Receivers, IEEE Transactions on Consumer Electronics, vol. 53, No. 2, May 2007.

Sato. Principles and Applications of CDMA Technology, 1977, Realize Inc., pp. 61-63.

* cited by examiner

SLIDING CORRELATION DIRECTION

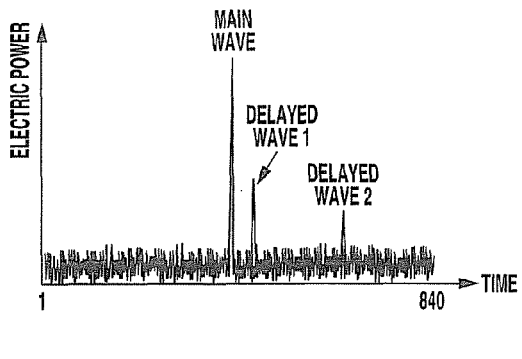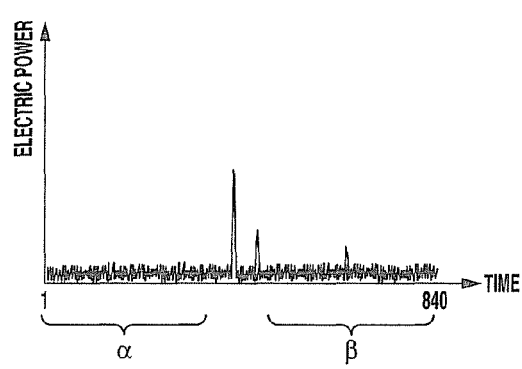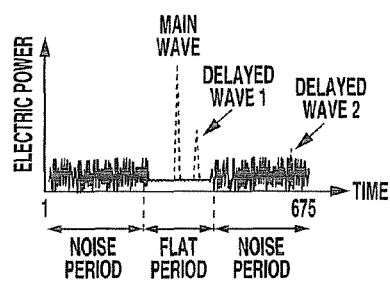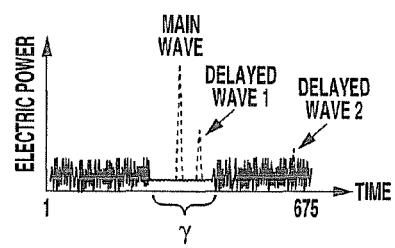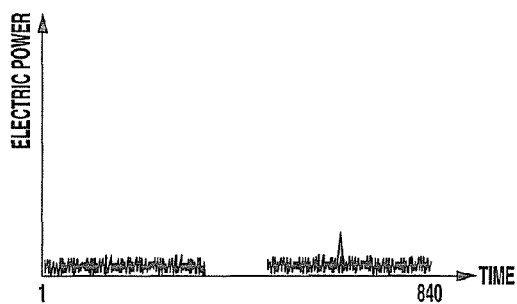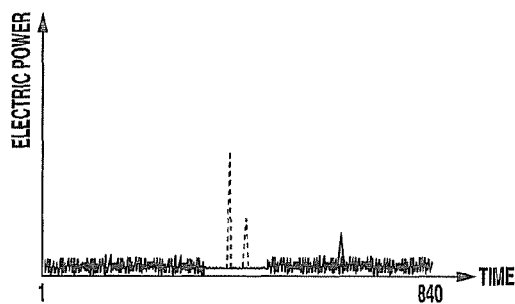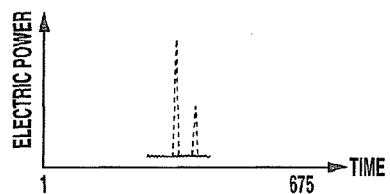

CHANNEL ESTIMATOR

CROSS-REFERENCE TO RELATED APPLICATION(S)

This application is based upon and claims the benefit of priority from Japanese Patent Application No. 2009-198735 filed on Aug. 28, 2009, the entire contents of which are incorporated herein by reference.

BACKGROUND

1. Field

Embodiments described herein relate generally to a channel estimator in a broadcasting reception system and a wireless communication reception system.

2. Description of the Related Art

In a broadcasting system and a wireless communication system, in general, a wireless signal transmitted from a transmission station is reflected, scattered, and diffracted by geographic features, buildings, and other objects before reaching a receiver, and the resultant plurality of wireless signals reach the receiver. When the receiver receives the wireless signals having originated from the single transmitter but traveled through different paths, the signals are combined into a single signal having a deformed waveform in some cases. The phenomenon is generally called multipath, and the paths through which the wireless signals travel are called multipath channels.

To address the problem, the receiver processes the received signal having a distorted waveform to reproduce the original waveform of the wireless signal transmitted from the transmission station. The process is generally called an equalization process.

In general, a distortion component produced in each multipath channel can be expressed as a filter response obtained when an impulse signal is inputted, and the equalization process performed in the receiver is improved by precisely estimating the channel response. The channel response is generally called a delay profile.

It has been known that a channel estimator in a receiver in a wireless communication system uses a known signal sequence contained in a received signal as a reference signal and determines complex time correlation between the received signal and the reference signal to calculate a delay profile.

In some wireless systems, a specific code sequence (a pseudo random noise (PN) sequence, for example) is used as the known signal sequence and cyclically extended prefix and postfix are inserted before and after the specific code sequence in some cases.

Now, for example, assume a wireless system in which a signal frame is composed of the known cyclically extended signal sequence described above (hereinafter referred to as a frame header) and signal data (hereinafter referred to as a frame body) and the thus configured signal frame is arranged. When the delay profile of the signal frame is calculated by using a channel estimator, the precision in the channel estimation is degraded by the following components:
(1) Degraded component produced by cross-correlation between the frame header and the reference signal
(2) Degraded component produced by cross-correlation between the frame body and the reference signal The degraded component (1) is produced in principle when complex time correlation between the frame header and the reference signal is calculated.

The degraded component (2) is very problematic because the cross-correlation between the frame body and the reference signal increases when a multipath signal having a delay longer than the frame header length is received.

However, when a multipath component and a degraded component are distinguished from each other in the calculated complex time correlation, a multipath component having relatively high electric power can be readily identified, whereas a multipath component having relatively low electric power, if any, is difficult to be identified. To identify a multipath component having relatively low electric power, for example, a signal having electric power higher than or equal to a predetermined threshold value can be judged as a multipath component. In this case, however, a multipath component may not be detected when the threshold value is set at a high value, whereas a degraded component may be wrongly judged as a multipath component when the threshold value is set at a low value.

BRIEF DESCRIPTION OF THE DRAWINGS

FIGS. 12A to 12G are graphs describing a method for producing a preferable correlation waveform by making use of the characteristics of the two PN420 and PN255 correlation waveforms, and FIG. 12A being a graph showing a PN420 correlation waveform, FIG. 12B being a graph showing a PN255 correlation waveform, FIG. 12C being a graph showing the waveform shown in FIG. 12A but having undergone level normalization, FIG. 12D being a graph showing the waveform shown in FIG. 12B but having undergone level normalization, FIG. 12E being a graph showing periods α and β extracted from the waveform shown in FIG. 12C, FIG. 12F being a graph showing a period γ extracted from the waveform shown in FIG. 12D, and FIG. 12G being a graph showing the waveform shown in FIG. 12E combined with the waveform shown in FIG. 12F.

DETAILED DESCRIPTION

In general, according to one embodiment, there is provided a channel estimator used in a receiver in a wireless system configured to receive a signal composed of frames arranged, each of the frames having a configuration in which a known pattern signal composed of a cyclically extended specific code sequence is periodically inserted. The channel estimator includes a plurality of correlating sections configured to calculate a plurality of time correlation values between the signal and a plurality of known pattern signals having different code lengths, an analyzing section configured to output a control signal representing a selected period for extracting a preferable correlation output from the output from each of the plurality of correlating sections, and a delay profile generating section configured to output a delay profile obtained by adaptively selecting or combining parts of the outputs from the plurality of correlating sections based on the output from the analyzing section.

Embodiments of the present invention will be described below in detail with reference to the drawings.

First Embodiment

Figure 1:
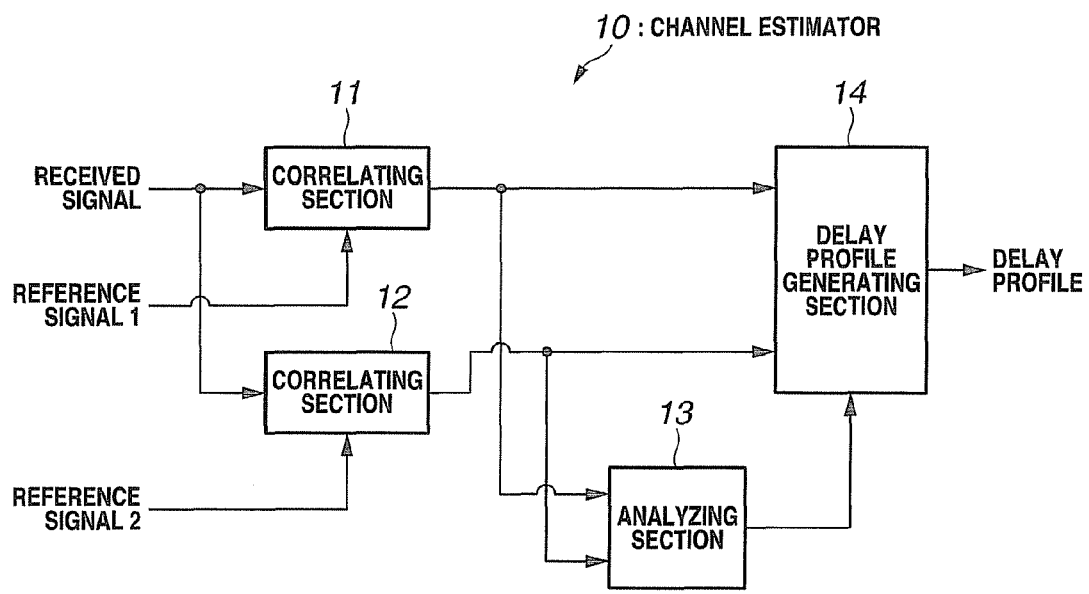
FIG. 1 is a block diagram showing a channel estimator according to a first embodiment of the present invention.

FIG. 1 shows the configuration of a channel estimator according to a first embodiment of the present invention.

The first embodiment relates to a case where the present invention is applied to a receiver in a wireless system in which a specific known pattern signal composed of a cyclically extended specific code sequence is periodically inserted in a frame.

In FIG. 1, a channel estimator 10 includes a plurality of (two in FIG. 1) correlating sections 11 and 12 configured to calculate time correlation between a received signal and reference signals 1, 2, which are a plurality of (two in FIG. 1) known pattern signals having different code lengths, an analyzing section 13 configured to output a control signal representing preferable selected periods of the outputs from the two correlating sections 11 and 12, and a delay profile generating section 14 configured to output a delay profile obtained by adaptively selecting or combining parts of the outputs from the two correlating sections 11 and 12 based on the control signal from the analyzing section 13.

Figure 3:
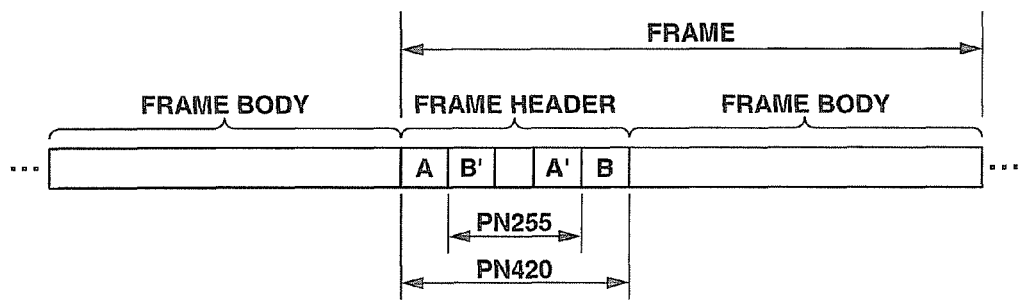
FIG. 3 is a diagram describing the configuration of a frame in which a known pattern signal composed of a cyclically extended specific code sequence is periodically inserted.

The received signal, which will be described later with reference to FIG. 3, is composed of signal frames (hereinafter simply referred to as frames) into each of which a known pattern signal is periodically inserted. The received signal is supplied to the correlating sections 11 and 12. The correlating section 11 calculates complex time correlation between the received signal and the reference signal 1 and normalizes the resultant correlation value. The normalized correlation value is supplied to the analyzing section 13 and the delay profile generating section 14. Similarly, the correlating section 12 calculates complex time correlation between the received signal and the reference signal 2 and normalizes the resultant correlation value. The reference signals 1 and 2 are known pattern signals having different code lengths. The normalization in the correlating sections 11 and 12 is performed to equalize the electric power levels of common correlation signals (the correlation value with respect to a main wave in the received signal or the correlation value with respect to a single delayed wave in the received signal) in the two types of correlation waveform outputted from the correlating sections 11 and 12. The two normalized correlation values from the correlating sections 11 and 12 are supplied to the analyzing section 13 and the delay profile generating section 14.

The analyzing section 13 computes the amounts of electric power of the two types of correlation value provided from the upstream correlating sections 11 and 12 and judges whether or not the computed amounts of electric power exceed a threshold value to determine whether or not an effective delayed wave is present. When an effective delayed wave is present, a control signal representing a selected period for extracting a correlation output to be preferably used from each of the two types of correlation value is outputted by detecting the temporal position of the delayed wave.

The delay profile generating section 14 selects or combines parts of the two types of correlation value outputted from the correlating sections 11 and 12 based on the control signal from the analyzing section 13 and outputs a final delay profile obtained by combining the delay profiles in the preferably used periods.

Figure 2:
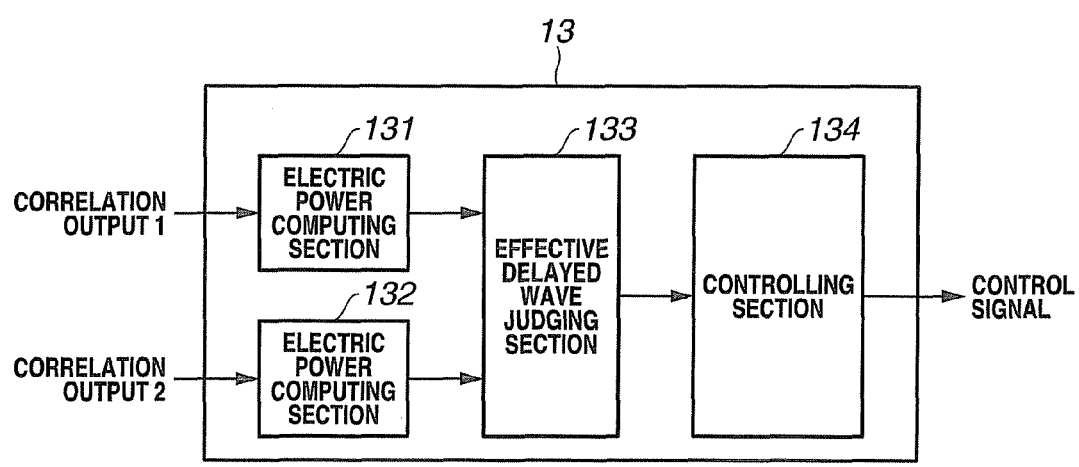
FIG. 2 is a block diagram showing an example of the configuration of an analyzing section shown in FIG. 1.

FIG. 2 shows an example of the configuration of the analyzing section 13 shown in FIG. 1.

In FIG. 2, the analyzing section 13 includes an electric power computing section 131, an electric power computing section 132, an effective delayed wave judging section 133, and a controlling section 134.

The electric power computing section 131 receives the time correlation value outputted from the correlating section 11 and computes the amount of electric power of the time correlation value.

The electric power computing section 132 receives the time correlation value outputted from the correlating section 12 and computes the amount of electric power of the time correlation value.

The effective delayed wave judging section 133 judges whether or not one or both of the amounts of electric power of first and second correlation outputs in flat periods, which will be described later, provided from the electric power computing sections 131 and 132 exceed a threshold value so as to judge whether or not a delayed wave having an effective magnitude is present in the flat period of at least one of the correlation waveforms.

Figure 8:
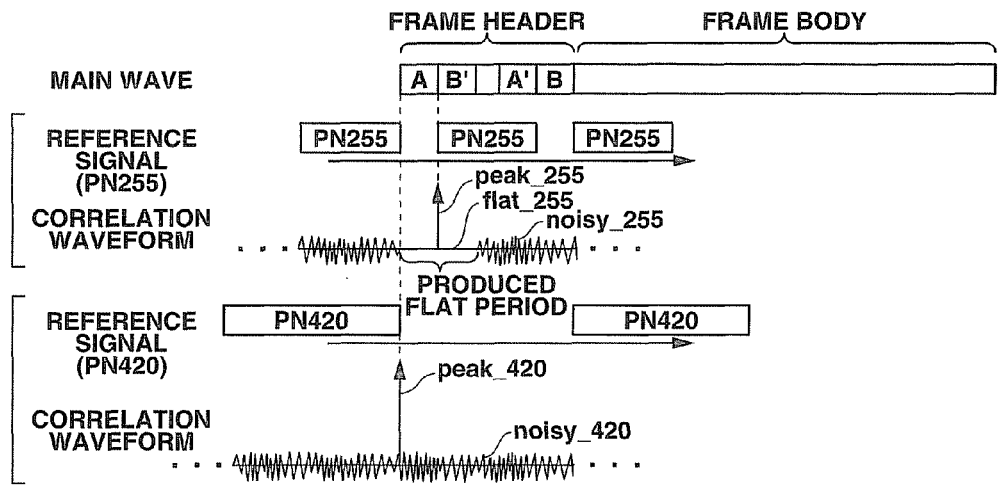
FIG. 8 is a diagram showing the electric power peak appearing timing and a flat period produced when a sliding correlation operation is performed with respect to a received signal formed only of a main wave with no multipath wave by using the code length of the reference signal PN255.

The flat period can be determined as a period that has an electric power peak showing correlation to the front portion of a PN sequence in a frame header of a main wave (or a delayed wave) and corresponds to the range including the electric power peak at the center of the range and extending from the front portion of the frame header to the tail portion of the time length obtained by adding a prefix (A) to the subsequent code sequence (B') (=the same code sequence as the postfix (B) described above), as will be described later with reference to FIG. 8.

The controlling section 134 uses the judgment result obtained from the effective delayed wave judging section 133 to output a control signal representing a preferably used period of each of the two types of correlation value from the correlating sections 11 and 12. When the effective delayed wave judging section 133 judges that no delayed wave is present, the controlling section 134 outputs, for example, only a high level as the control signal over the entire period in a correlation calculation range, whereas when the effective delayed wave judging section 133 judges that a delayed wave is present, the controlling section 134 outputs a low level as the control signal in a flat period in the correlation calculation range and a high level as the control signal in the period other than the flat period. The correlation calculation range corresponds to what is called the amount of sliding, which is the number of correlation operations required to determine a correlation value for one symbol, that is, the length of the waveform. Further, outputting the high-level control signal corresponds to choosing the first correlation output from the correlating section 11 in the delay profile generating section 14, which will be described later, whereas outputting the low-level control signal corresponds to choosing the second correlation output from the correlating section 12 in the delay profile generating section 14.

The thus configured analyzing section 13 computes the amounts of electric power in the flat periods of the correlation signals outputted from the correlating sections 11 and 12, judges whether or not an effective delayed wave is present in the flat periods, and outputs a control signal based on the judgment result to control the delay profile generating section 14. When having judged that no delayed wave is present, the analyzing section 13 controls the delay profile generating section 14 to choose and output only the correlation waveform from the correlating section 11 as a delay profile, whereas when having judged that a delayed wave is present, the analyzing section 13 controls the delay profile generating section 14 to choose and output the waveform in the flat period of the correlation waveform from the correlating section 12 and choose and output the waveform in the period other than the flat period described above in the correlation waveform from the correlating section 11.

The delay profile generating section 14 operates as what is called a selector configured to choose the first correlation signal from the correlating section 11 or the second correlation signal from the correlating section 12 in the correlation calculation range based on the control signal from the analyzing section 13.

A method for precisely estimating a channel response in the thus configured channel estimator will be described with reference to FIGS. 3 to 9.

FIG. 3 shows a signal composed of arranged frames each of which has a configuration in which a known pattern signal composed of a cyclically extended specific code sequence is periodically inserted.

The configuration of each of the frames in which a known pattern signal composed of a cyclically extended specific code sequence is periodically inserted will first be described with reference to FIG. 3.

As shown in FIG. 3, the frame is composed of a frame header and a frame body. The frame header is composed of a known pattern signal composed of a specific code sequence (M sequence in PN sequence, for example) and cyclically extended prefix and postfix inserted before and after the specific code sequence.

Specifically, the frame header is composed of a prefix A (82 symbols), a PN sequence (255 symbols, hereinafter referred to as PN255), which is a predetermined code sequence, and a postfix B (83 symbols). The length of the frame header is the sum of the lengths of the elements described above, that is, 82+255+83=420 symbols (hereinafter referred to as PN420). The prefix A is a code sequence that is the same as the tail-end sequence A' (82 symbols), and the prefix B is a code sequence that is the same as the front-end sequence B' (83 symbols).

The frame body is composed of signal data, such as a transport stream (TS).

A description will next be made of a method for calculating complex time correlation to estimate a channel response for a received signal having a configuration in which the frame shown in FIG. 3 having the frame header composed of the cyclically extended specific code sequence inserted therein is arranged. The frame configuration shown in FIG. 3 is used as the digital terrestrial broadcasting in the People's Republic of China (hereinafter referred to as China).

Figure 4:
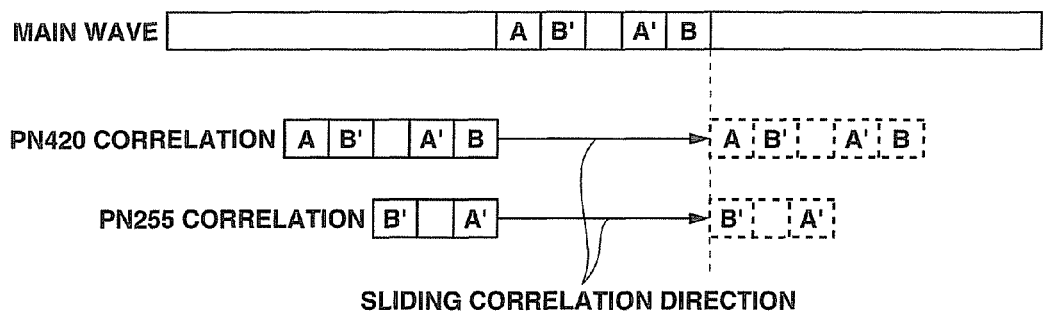
FIG. 4 is a diagram showing calculation of complex time correlation with respect to a received signal formed only of a main wave with no multipath wave by using reference signals PN255 and PN420 having two different code lengths.

FIG. 4 shows calculation of complex time correlation with respect to a received signal formed only of a main wave with no multipath wave by using the reference signals PN255 and PN420 having two different code lengths. FIG. 4 shows a case where complex time correlation is calculated, for example, by using sliding correlation in which a reference signal is shifted with respect to a received signal by one symbol at a time.

The calculation of the complex time correlation by using the code length of PN420 is made from the timing 420 symbols before the first symbol of the frame header of the main wave in the received signal to the last symbol of the frame header (420 symbols) of the main wave, as shown in FIG. 4. The period is an example of the correlation calculation range in the PN420 correlation. The complex time correlation range is not limited to the example described above but may be a wider one. For example, the range may be a wider one from the timing greater than 420 symbols before the first symbol of the frame header of the main wave to a temporal position beyond the last symbol of the frame header of the main wave. The calculation of the complex time correlation by using the code length of PN255 is made from the timing 255 symbols before the first symbol of the frame header of the main wave in the received signal to the last symbol of the frame header (420 symbols) of the main wave, as shown in FIG. 4. The period is an example of the correlation calculation range in the PN255 correlation. The complex time correlation range is not limited to the example described above but may be a wider one. For example, the range may be a wider one from the timing greater than 255 symbols before the first symbol of the frame header of the main wave to a temporal position beyond the last symbol of the frame header of the main wave.

Figure 5A:
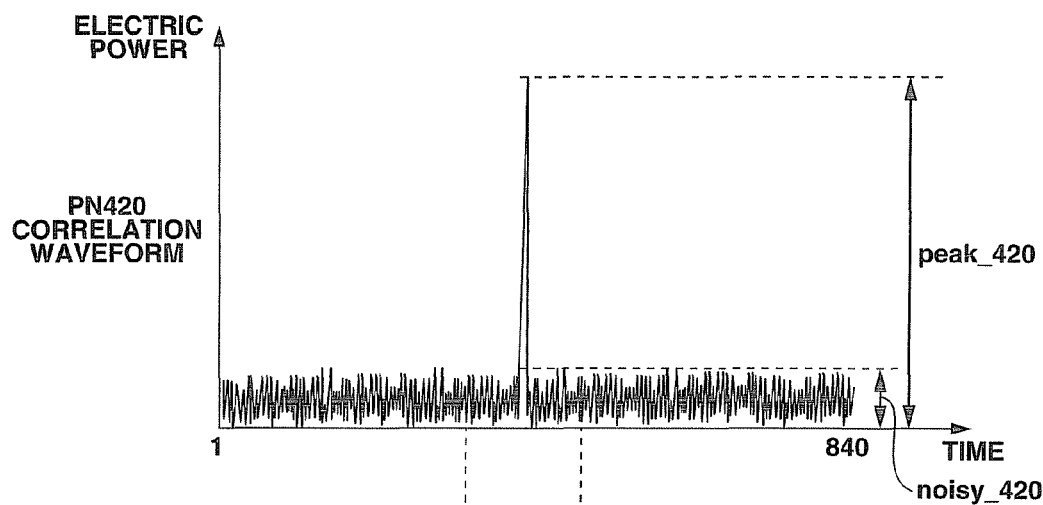
FIGS. 5A and 5B are graphs showing correlation waveforms obtained by performing correlation calculation with respect to a received signal formed only of a main wave shown in FIG. 4, FIG. 5A being a graph showing a PN420 correlation waveform and FIG. 5B being a graph showing a PN255 correlation waveform.
Figure 5B:
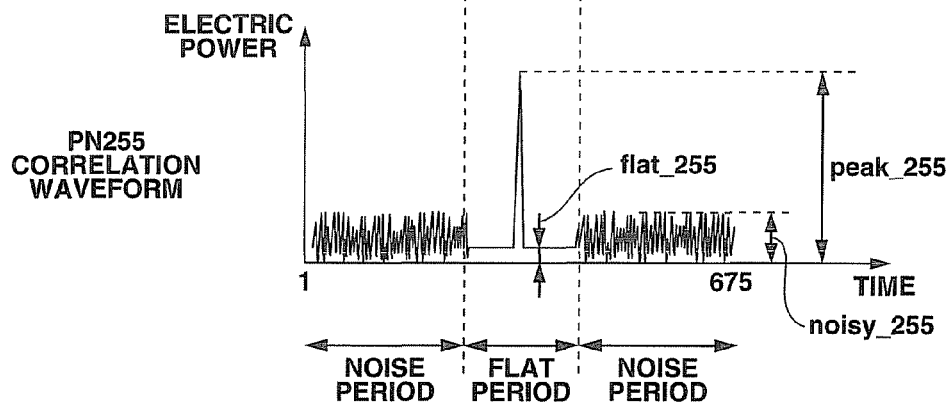

FIGS. 5A and 5B show the waveforms of correlation outputs (hereinafter referred to as correlation waveforms) obtained by performing the correlation calculation described above with respect to the received signal formed only of a main wave with no multipath wave, such as the one shown in FIG. 4.

In practice, FIGS. 5A and 5B show waveforms having pseudo peaks due to the prefix and postfix described in Guanghui Liu etc, "ITD-DFE Based Channel Estimation and Equalization in TDS-OFDM Receivers," IEEE Transactions on Consumer Electronics, Vol. 53, No. 2, MAY 2007. FIG. 5A shows a PN420 correlation waveform, and FIG. 5B shows a PN255 correlation waveform. The pseudo peak is a small-level electric power peak that appears, for example, when a set of successive code sequences composed of the PN420 code sequence A (=A') and code sequence B (=B') partially correlates with the set of the code sequence A (=A') and the code sequence B (=B') in the frame header of the main wave (when the set of A and B' coincides with, that is, partially coincides with, the set of A' and B) in the process of performing the sliding correlation between the main wave and PN420 on a symbol basis in FIG. 4. According to the correlation calculation described with reference to FIG. 4, the pseudo peak appears before and after the electric power peak produced when the reference signal PN420 completely correlates with the frame header of the received signal. The pseudo peak is also called a pseudo delayed wave. The pseudo peak is omitted in FIGS. 5A, 5B, FIGS. 10A, 10B, and other figures to readily make and simplify the description because embodiments of the present invention can be implemented irrespective of the presence or absence of the pseudo peak.

The characteristics of the correlation waveforms shown in FIGS. 5A and 5B will be described below. FIGS. 5A and 5B show correlation waveforms with respect to the received signal formed only of a main wave, such as the one shown in FIG. 4.

In FIGS. 5A and 5B, the vertical axis represents electric power, and the horizontal axis represents delayed symbol time. When the code length of PN420 shown in FIG. 5A is used, correlation values for 420+420=840 symbols are obtained, and when the code length of PN255 shown in FIG. 5B is used, correlation values for 420+255=675 symbols are obtained. The 840 symbol period for PN420 and the 675 symbol period for PN255 are within the correlation calculation ranges for the code lengths of the reference signals 1 and 2, respectively. The correlation calculation range is not limited to the 840 symbols or the 675 symbols for the PN420 correlation or the PN255 correlation, but may be wider, as described above. Now, let peak_420 be a peak electric power of the PN420 correlation waveform shown in FIG. 5A, and noisy_420 be the highest electric power in a noisy period (hereinafter referred to as a noise period) other than the peak.

Similarly, peak_255 and noisy_255 are defined for the PN255 correlation waveform shown in FIG. 5B. The PN255 correlation waveform is characterized in that the prefix and postfix described above create a fixed-value period extending from the point 82 symbols before the peak to the point 83 symbols after the peak. The fixed-value period is referred to as a flat period, and the electric power during the flat period is referred to as flat_255. The flat period will be described with reference to FIG. 8.

The following relationship is satisfied in the flat period: peak_420/noisy_420<peak_255/flat_255, which means that PN255 has a clearer peak. The following relationship is satisfied in the period other than the flat period: peak_420/noisy_420>peak_255/noisy_255, which means that PN420 has clearer peaks, because the number of interval integral performed in the PN420 correlation detection is larger than the number of interval integral performed in the PN255 correlation detection. The number of interval integral corresponds to the integral range over which correlation operation is performed to determine a correlation value for one symbol in a correlation waveform. In this case, the integral ranges correspond to the lengths of the reference signals (420 or 255). It is therefore possible to obtain a preferable correlation waveform having clear peaks over the widest correlation calculation range by choosing the PN420 correlation waveform in the flat period and the PN255 correlation waveform in the period other than the flat period.

Figure 6:
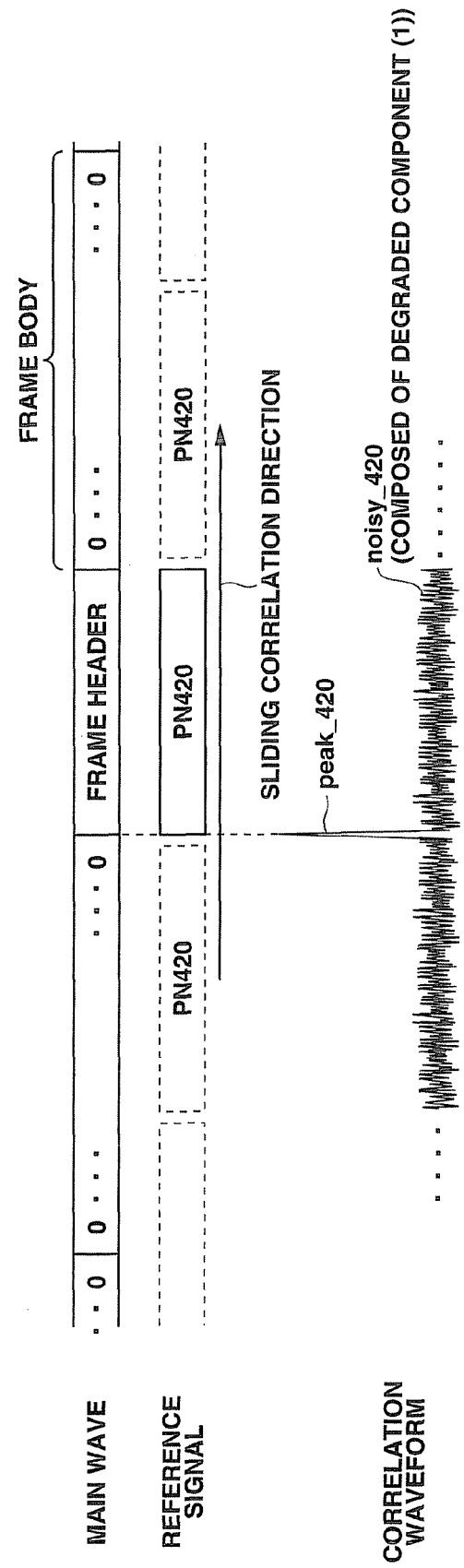
FIG. 6 is a diagram showing an electric power peak appearing timing and a degraded component (1) produced when data in a frame body are all zero in a sliding correlation operation performed with respect to a received signal formed only of a main wave with no multipath wave by using the code length of the reference signal PN420.

FIG. 6 shows a peak appearing timing and the degraded component (1) produced when the data in the frame body are all zero in a sliding correlation operation performed with respect to a received signal formed only of a main wave by using the code length of the reference signal PN420.

When the PN420 correlation operation is performed with respect to the main wave, the peak peak_420 appears when PN420 correlates (completely coincide) with the frame header even with the data in the frame body other than the frame header (cyclically extended PN sequence) being all zero, and the degraded component waveform noisy_420, which is a small-amplitude noise component, is outputted as the degraded component (1) at the other timings (when the frame header partially overlaps with PN420). The timing at which the peak peak_420 appears corresponds to the front position of the frame header when the reference signal PN420 completely coincides with the frame header of a frame of the main wave (see FIG. 6).

In FIG. 6, the degraded component waveform noisy_420 represents the degraded component (1) produced by cross-correlation between the frame header and the reference signal PN420. When the reference signal PN420 is shifted, even slightly, from the frame header and hence there is no correlation, the degraded component (1) produced by the cross-correlation between the frame header and the reference signal PN420 forms the degraded component noisy_420.

Figure 7:
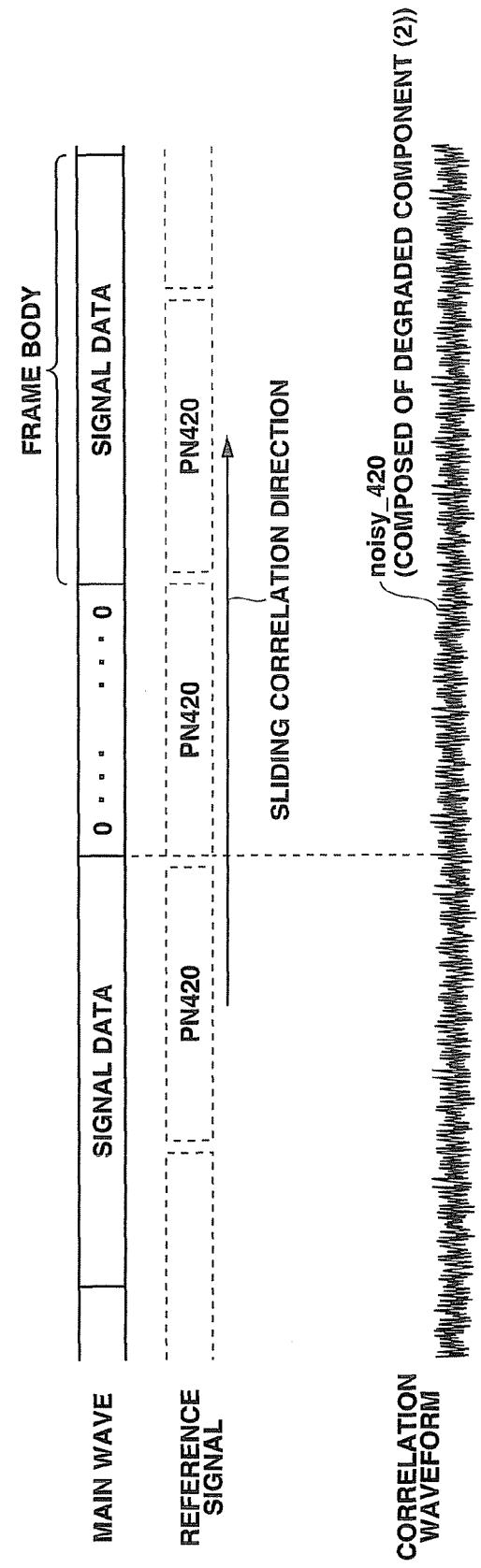
FIG. 7 is a diagram showing a degraded component (2) produced when data in a frame header are all zero in a sliding correlation operation performed with respect to a received signal formed only of a main wave with no multipath wave by using the code length of the reference signal PN420.

FIG. 7 shows the degraded component (2) produced when the data in the frame header are all zero in a sliding correlation operation performed with respect to a received signal formed only of a main wave by using the code length of the reference signal PN420.

When the PN420 correlation operation is performed with respect to the main wave, and the signal data in the frame body are not zero but the data in the frame header are all zero, the correlation value becomes instantaneously zero at the point where the time length of the reference signal PN420 completely coincides with that of the frame header, and even a slight shift in the coincidence produces a portion where there is no cross-correlation, resulting in the degraded component waveform noisy_420, which is a small-amplitude noise component, outputted as the degraded component (2).

In FIG. 7, when the reference signal PN420 is shifted from the frame header by even a single symbol and at least part of the reference signal PN420 slides into the frame body region containing signal data, a portion where there is no cross-correlation is produced, and hence the degraded component (2) produced by the cross-correlation between the frame body and the reference signal PN420 forms noisy_420.

As described above, when the frame body is zero as shown in FIG. 6, noisy_420 contains only the degraded component (1) produced by the cross-correlation, whereas when the frame header is zero as shown in FIG. 7, noisy_420 contains only the degraded component (2) produced by the cross-correlation. Practically, since the frame body has signal data and the frame header has a specific code sequence as a known signal sequence, the degraded component waveform noisy_420 contains the degraded component (1) produced by the cross-correlation between the frame header and the reference signal PN420 and the degraded component (2) produced by the cross-correlation between the frame body and the reference signal PN420.

FIG. 8 shows the peak appearing timing and the flat period produced when a sliding correlation operation is performed with respect to a received signal formed only of a main wave by using the code length of the reference signal PN255. FIG. 8 also shows the peak appearing timing when the code length of the reference signal PN420 is used.

When the PN255 correlation operation is performed with respect to the main wave, during the period in which the sliding correlation is being performed and the PN255 sequence (see FIG. 4) is within the range of the cyclically extended PN sequence (corresponding to the frame header) of the main wave, the PN255 sequence does not completely coincide with the frame header except when the PN255 sequence completely coincides with parts of the frame header, whereas during the period in which the PN255 sequence is within the frame header containing the sequence component that is the same as the PN255 sequence, the PN255 sequence partially coincides but does not completely coincide with the frame header. In this state, a flat period flat_255 appears on both sides of the electric power peak peak_255 produced when the PN255 sequence completely coincides with the frame header. The period other than the flat period flat_255 is a portion where there is no correlation but the degraded component noisy_255 is produced. On the other hand, when correlation detection using the reference signal PN420 is performed, the PN420 sequence completely coincides with the frame header only at a single point and no flat period is produced. As a result, the degraded component noisy_420 is produced when the correlation is, even slightly, shifted.

Figure 9:
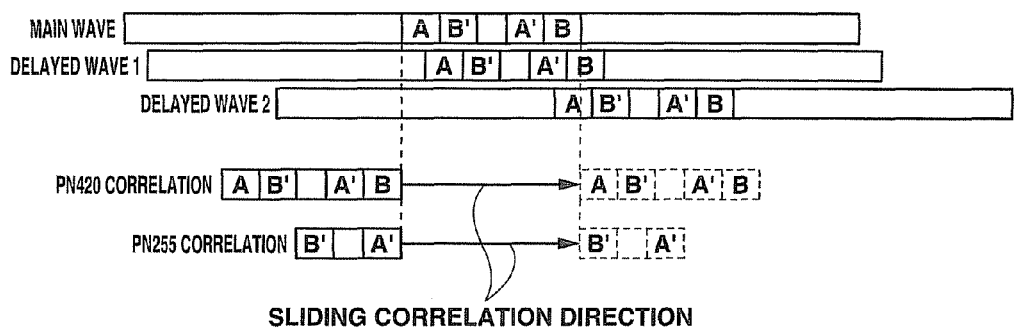
FIG. 9 is a diagram showing that complex time correlation is performed with respect to a received signal containing a main wave and multipath waves, a delayed wave 1 and a delayed wave 2, by using the reference signals PN420 and PN255 having two different code lengths.

FIG. 9 shows that complex time correlation is performed with respect to a received signal containing a main wave and multipath waves, a delayed wave 1 and a delayed wave 2, by using two different code lengths, PN420 and PN255.

Figure 10A:
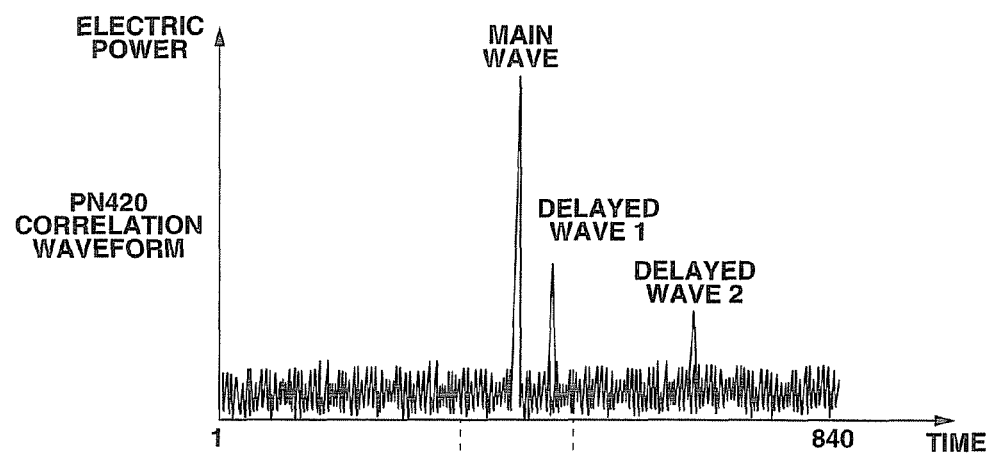
FIGS. 10A and 10B are graphs showing correlation waveforms produced when correlation calculation is performed with respect to a received signal containing the multipath waves shown in FIG. 9, FIG. 10A being a graph showing a PN420 correlation waveform and FIG. 10B being a graph showing a PN255 correlation waveform.
Figure 10B:
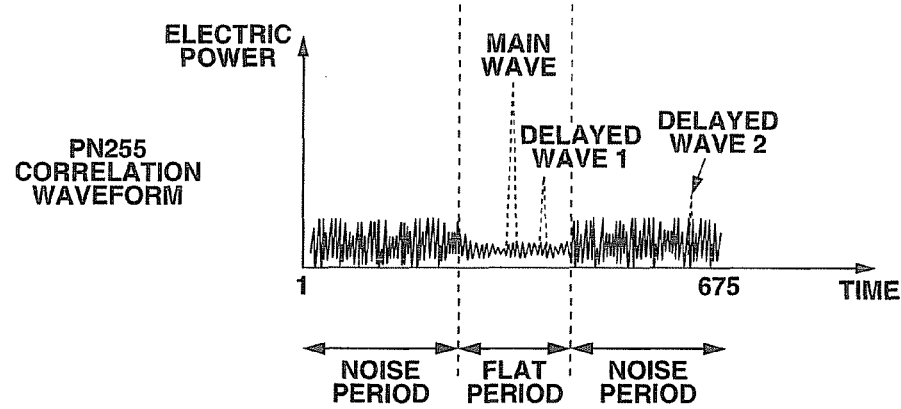

FIGS. 10A and 10B show correlation waveforms produced when correlation calculation is performed with respect to a received signal containing the multipath waves shown in FIG. 9. FIG. 10A shows a PN420 correlation waveform, and FIG. 10B shows a PN255 correlation waveform. The characteristics of the PN420 correlation waveform are compared with those of the PN255 correlation waveform below.

Looking first at the delayed wave 1, one can find that the delayed wave 1 having the PN420 correlation waveform shown in FIG. 10A is affected by the noise periods of the main wave and the delayed wave 2 and distorted accordingly. On the other hand, the delayed wave 1 having the PN255 correlation waveform shown in FIG. 10B is affected only by the noise period of the delayed wave 2 because the delayed wave 1 is within the flat period of the main wave.

Looking next at the delayed wave 2, one can find that the delayed wave 2 having the PN420 correlation waveform shown in FIG. 10A is affected by the noise periods of the main wave and the delayed wave 1 and distorted accordingly but has electric power large enough for a peak to be recognized because the number of interval integral in the complex time correlation operation is large. On the other hand, the delayed wave 2 having the PN255 correlation waveform shown in FIG. 10B is also affected by the noise periods of the main wave and the delayed wave 1 and distorted accordingly and it is difficult to recognize any peak because the number of interval integral in the complex time correlation operation is small.

Figure 11:
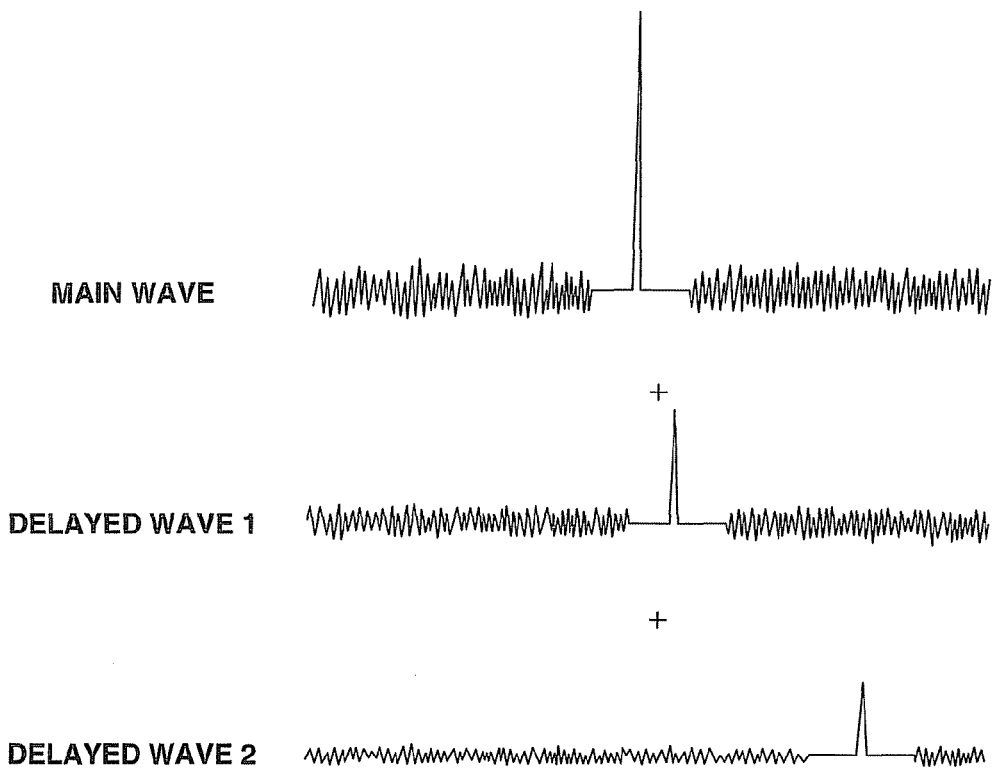
FIG. 11 is a diagram showing the waveforms of the main wave, the delayed wave 1, and the delayed wave 2 divided from the correlation waveform shown in FIG. 10B produced by performing correlation detection with respect to a received signal containing multipath waves by using the reference signal PN255.

FIG. 11 shows three correlation waveforms of the main wave, the delayed wave 1, and the delayed wave 2 divided from the correlation waveform (see FIG. 10B) produced by performing correlation detection with respect to the received signal containing multipath waves by using the reference signal PN255. The three correlation waveforms of the main wave, the delayed wave 1, and the delayed wave 2 shown in FIG. 11 produced by the PN255 correlation are therefore combined into the PN255 correlation waveform shown in FIG. 10B.

A method for producing a preferable correlation waveform by making use of the characteristics of the PN420 and PN255 correlation waveforms described above will be described with reference to FIGS. 12A to 12G.

FIG. 12A shows a PN420 correlation waveform. FIG. 12B shows a PN255 correlation waveform. FIG. 12C shows the waveform shown in FIG. 12A but having undergone level normalization. FIG. 12D shows the waveform shown in FIG. 12B but having undergone level normalization. FIG. 12E shows periods α and β extracted from the waveform shown in FIG. 12C. FIG. 12F shows a period γ extracted from the waveform shown in FIG. 12D. FIG. 12G shows the waveform shown in FIG. 12E combined with the waveform shown in FIG. 12F.

First, the correlating section 11 performs complex time correlation with respect to a received signal by using the reference signal PN420 to calculate the PN420 correlation waveform shown in FIG. 12A. Similarly, the correlating section 12 uses the reference signal PN255 to calculate the PN255 correlation waveform shown in FIG. 12B.

The correlating sections 11 and 12 then normalize the PN420 correlation waveform shown in FIG. 12A and the PN255 correlation waveform shown in FIG. 12B into the correlation waveforms shown in FIGS. 12C and 12D, respectively. To normalize the PN420 correlation waveform with respect to the PN255 correlation waveform, for example, all values of the PN420 correlation waveform are multiplied by peak_255/peak_420. The normalization can alternatively be carried out by multiplying the values of the PN420 correlation waveform by the ratio of the number of interval integral in the PN255 complex time correlation operation to that in the PN420 complex time correlation operation (255/420). The normalization method is not limited to the above examples.

The analyzing section 13 then judges whether or not the flat period contains a delayed wave. The judgment may be made by judging whether the flat period contains a delayed wave having electric power greater than a predetermined threshold value or may be made by examining the total amount of electric power in the flat period.

When the judgment shows that the flat period contains a delayed wave, the delay profile generating section 14 extracts the flat period (the period γ shown in FIG. 12D) from the PN255 correlation waveform shown in FIG. 12D, as shown in FIG. 12F, and extracts the period other than the flat period (the periods α and β shown in FIG. 12C) from the PN420 correlation waveform shown in FIG. 12C, as shown in FIG. 12E. In this process, the flat period may be always extracted from the PN255 correlation waveform shown in FIG. 12D and the period other than the flat period may be always extracted from the PN420 correlation waveform shown in FIG. 12C without judgment of whether or not the flat period contains a delayed wave.

Finally, the delay profile generating section 14 combines the waveform shown in FIG. 12E with the waveform shown in FIG. 12F into a final delay profile.

As described above, making use of the effective characteristics of the two types of correlation waveform allows a final preferable delay profile to be generated.

The present embodiment has been described with reference to the case where complex time correlation is performed by using known pattern signals as reference signals having two different code lengths, but the number of types of code length is not limited to two. Alternatively, known pattern signals having a plurality of different code lengths may be used. Further, a plurality of correlating sections are not necessarily prepared, but a single correlating section may be used to calculate complex time correlation by using a plurality of difference code lengths, whereby the circuit scale can be reduced.

Moreover, in the thus obtained delay profile, a delayed wave having electric power lower than a predetermined threshold value may be considered as a noise and set at zero to improve the S/N ratio, or pseudo peaks may be removed by using the method described in Guanghui Liu etc, "ITD-DFE Based Channel Estimation and Equalization in TDS-OFDM Receivers," IEEE Transactions on Consumer Electronics, Vol. 53, No. 2, MAY 2007.

According to the first embodiment, the channel response can be more precisely estimated even in an environment in which multipath waves along which relatively low electric power is transmitted are present, whereby a high-precision channel estimator can be provided.

Second Embodiment

Figure 13:
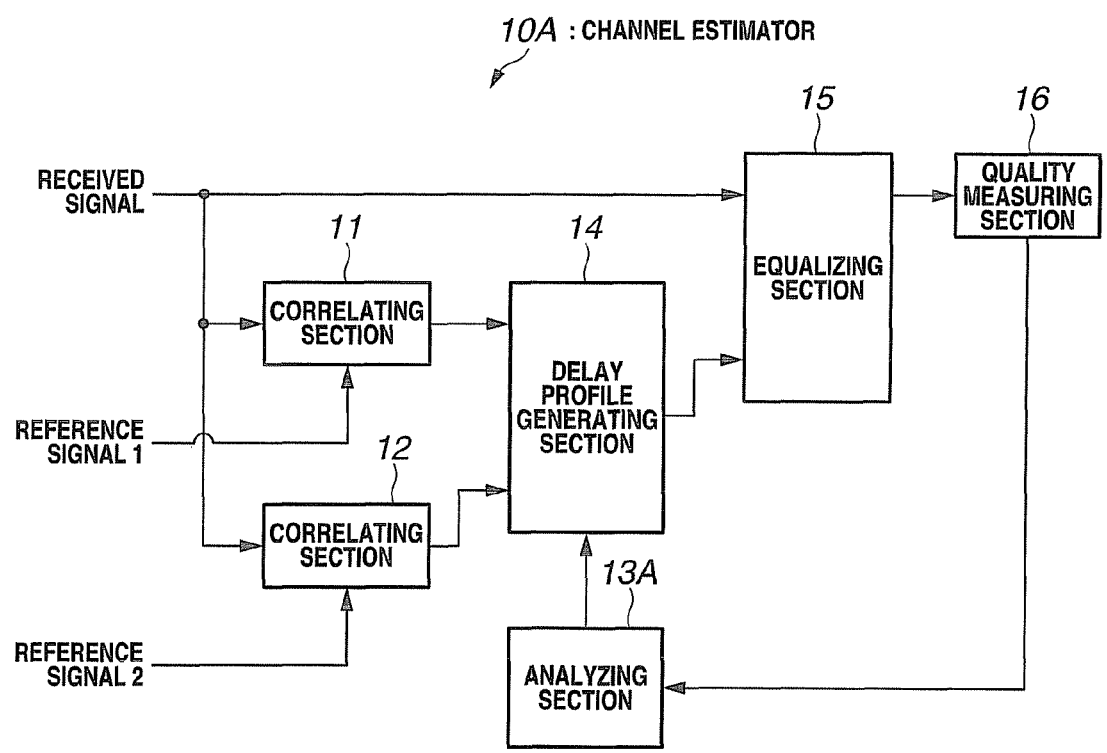
FIG. 13 is a block diagram showing a channel estimator according to a second embodiment of the present invention.

FIG. 13 shows the configuration of a channel estimator according to a second embodiment. In the following description, the components in FIG. 13 that are the same as those in FIG. 1 have the same reference characters.

In the first embodiment, the analyzing section 13 judges whether or not a delayed wave is present in the flat period of a correlation waveform based on the amount of electric power and determines based on the judgment result a preferably used correlation output period selected from the output from each of a plurality of correlating sections.

The second embodiment differs from the first embodiment in that the selected period of the correlation waveform is dynamically controlled in such a way that a demodulated S/N ratio after the equalization process is judged to be a preferred value.

As shown in FIG. 13, the channel estimator of the second embodiment further includes an equalizing section 15 and a quality measuring section 16 in addition to the components in the first embodiment. An analyzing section 13A receives quality data from the quality measuring section 16 and outputs a control signal that dynamically changes the selected period for extracting a correlation output from the output from each of the plurality of correlating sections 11 and 12 in such a way that the quality data show preferable values.

In the equalizing section 15, the frame body of a received signal undergoes amplitude/phase equalization based on a delay profile outputted from the delay profile generating section 14. The equalization result is supplied to the quality measuring section 16.

The quality measuring section 16 is formed, for example, of an S/N measuring section, calculates a Euclidean distance from a reference symbol based on the equalization result obtained from the equalizing section 15, and, for example, integrates the Euclidean distance to calculate the quality of the current equalization result in the form of S/N ratio. The calculated S/N ratio is fed back to the analyzing section 13A.

The analyzing section 13A outputs a control signal representing a preferable selected period of the output from each of the plurality of correlating sections 11 and 12 in accordance with the S/N ratio to the delay profile generating section 14 in such a way that the S/N ratio supplied as the quality data from the quality measuring section 16 shows a preferred value so as to dynamically change the selected period of the correlation waveform from each of the correlating sections 11 and 12.

Instead of dynamically changing the selected period of the correlation waveform from each of the correlating sections 11 and 12 in accordance with the S/N ratio, one of the correlation outputs 1 and 2 from the correlating sections 11 and 12 may alternatively be chosen in accordance with the S/N ratio. When the correlation output 2 is chosen, the time width of the flat period of the thus chosen correlation output 2 may be further dynamically changed in accordance with the S/N ratio. Still alternatively, in the correlation calculation range, both the correlation outputs 1 and 2 from the correlating sections 11 and 12 may be chosen in accordance with the S/N ratio. In this case, preferable selected periods of the correlation outputs may be changed, that is, the time widths of the flat periods as the selected periods for extracting the correlation output 2 may be dynamically changed, in accordance with the S/N ratio.

The channel estimator 10A according to the second embodiment can therefore also detect a delayed wave having a low electric power level to generate a delay profile with more precision.

The present embodiment has been described with reference to the case where only an S/N ratio is inputted to the analyzing section 13A. Alternatively, the selected period of a correlation waveform may be determined by using the combination of calculated electric power of the correlation waveform, as in the first embodiment, with an S/N ratio as the quality data.

Further, the above embodiment has been described with reference to the S/N ratio as the quality data from the quality measuring section 16. Alternatively, the error rate in demodulated data after the equalization process may be used as the quality data, and the selected period of a correlation waveform may be dynamically determined in accordance with the error rate.

According to the second embodiment, since a delay profile can be more precisely generated, a high-precision channel estimator can be provided.

Any of the embodiments described above can provide a channel estimator capable of precisely estimating a channel response even in an environment in which multipath waves along which relatively low electric power is transmitted are present.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A channel estimator used in a receiver in a wireless system configured to receive a signal composed of frames arranged, each of the frames having a configuration in which a known pattern signal composed of a cyclically extended specific code sequence is periodically inserted, the known pattern signal having a fixed code length, the channel estimator comprising:
   a plurality of correlating sections configured to calculate a plurality of time correlation values between each of the frames of the received signal and a plurality of known pattern signals having different code lengths;
   an analyzing section configured to output a control signal representing a selected period for extracting a preferable correlation output from the output from each of the plurality of correlating sections; and
   a delay profile generating section configured to output a delay profile obtained by adaptively selecting or combining parts of the outputs from the plurality of correlating sections based on the control signal from the analyzing section; wherein the plurality of correlating sections are configured with first and second correlating sections, normalizing a first correlation output from the first correlating section with respect to a second correlation output from the second correlating section.

2. The channel estimator according to claim 1,
wherein the plurality of correlating sections configured to calculate the plurality of time correlation values between the signal and the plurality of known pattern signals having the different code lengths and perform normalization for equalizing values of common correlation signals in the plurality of calculated correlation values.

3. The channel estimator according to claim 2, wherein the normalizing the first correlation output from the first correlating section with respect to the second correlation output from the second correlating section is carried out by multiplying all values of the first correlation output by the ratio of a peak value of the second correlation output to a peak value of the first correlation output.

4. The channel estimator according to claim 2, wherein the normalizing the first correlation output from the first correlating section with respect to the second correlation output from the second correlating section is carried out by multiplying all values of the first correlation output by the ratio of the number of interval integral for the second correlation output to the number of interval integral for the first correlation output.

5. The channel estimator according to claim 1,
wherein the analyzing section outputs the control signal representing a preferable selected period based on whether or not the total amount of electric power in a predetermined period of the output from each of the plurality of correlating sections exceeds a predetermined threshold value.

6. The channel estimator according to claim 1,
wherein the analyzing section outputs the control signal representing a preferable selected period based on whether or not the outputs from the plurality of correlating sections contain a delayed wave having electric power greater than a predetermined value.

7. The channel estimator according to claim 1,
wherein the delay profile generating section sets a delayed wave having electric power not greater than a predetermined threshold value at zero.

8. The channel estimator according to claim 1,
wherein the delay profile generating section suppresses a pseudo delayed wave produced by the correlation values calculated by the plurality of correlating sections.

9. The channel estimator according to claim 1,
wherein the analyzing section includes
a first electric power computing section configured to receive a time correlation value outputted from a first correlating section and compute the amount of electric power of the time correlation value,
a second electric power computing section configured to receive a time correlation value outputted from a second correlating section and compute the amount of electric power of the time correlation value,
an effective delayed wave judging section configured to judge whether or not the amount of electric power in flat periods of one or both of the first and second correlation outputs obtained from the first and second electric power computing sections exceeds a threshold value to judge whether or not the flat period of at least one of the correlation waveforms contains a delayed wave having an effective magnitude, and
a controlling section configured to output the control signal representing a preferably used period of each of the two types of correlation value from the first and second correlating sections based on the judgment result obtained from the effective delayed wave judging section.

10. The channel estimator according to claim 1,
wherein the analyzing section computes the
amount of electric power in a flat period of a correlation signal outputted from each of the first and second correlating sections, judges whether or not the flat period contains an effective delayed wave, controls the delay profile generating section to choose and output only the first correlation output from the first correlating section as a delay profile when the judgment result shows that no delayed wave is present, and controls the delay profile generating section to choose and output the flat period of the second correlation output from the second correlating section and choose and output a period other than the flat period of the first correlation output from the first correlating section when the judgment result shows that a delayed wave is present.

11. The channel estimator according to claim 10,
wherein the controlling section outputs only a first logic level in all periods in a correlation calculation range as the control signal when the effective delayed wave judging section has judged that no delayed wave is present, and outputs a second logic level in the flat period in the correlation calculation range as the control signal and the first logic level in the period other than the flat period as the control signal when the effective delayed wave judging section has judged that a delayed wave is present.

12. The channel estimator according to claim 11,
wherein the first logic level of the control signal corresponds to choosing the first correlation output from the first correlating section in the effective delayed wave judging section and the second logic level of the control signal corresponds to choosing the second correlation output from the second correlating section in the effective delayed wave judging section.

13. The channel estimator according to claim 1,
wherein the analyzing section judges whether
or not a flat period of the correlation signal outputted from any of the first and second correlating sections contains a delayed wave, and
when the analyzing section has judged that any of the flat periods contains a delayed wave, the delay profile generating section extracts the flat period from the second correlation output from the second correlating section, extracts a period other than the flat period from the first correlation output from the first correlating section, combines the second correlation output in the extracted flat period with the first correlation output in the extracted period other than the flat period, and outputs the combined output as a delay profile.

14. The channel estimator according to claim 13,
wherein the judgment of whether or not any of the flat periods contains a delayed wave is made by judging whether or not any of the flat periods contains a delayed wave having electric power greater than a predetermined threshold value.

15. The channel estimator according to claim 13,
wherein the judgment of whether or not any of the flat periods contains a delayed wave is made by judging whether or not the total amount of electric power in any of the flat periods is greater than a predetermined threshold value.

16. The channel estimator according to claim 1,
wherein the plurality of correlating sections are replaced with a single correlating section configured to calculate time correlation by using the plurality of different code lengths.

17. A channel estimator used in a receiver in a wireless system configured to receive a signal composed of frames arranged, each of the frames having a configuration in which a known pattern signal composed of a cyclically extended specific code sequence is periodically inserted, the known pattern signal having a fixed code length, the channel estimator comprising:
- a plurality of correlating sections configured to calculate a plurality of time correlation values between each of the frames of the received signal and a plurality of known pattern signals having different code lengths;
- an analyzing section configured to output a control signal that dynamically changes a selected period for extracting a correlation output from the output from each of the plurality of correlating sections based on quality data obtained from an equalizing section;
- a delay profile generating section configured to output a delay profile obtained by adaptively selecting or combining parts of the outputs from the plurality of correlating sections based on the control signal from the analyzing section;
- the equalizing section configured to perform phase/amplitude equalization on the signal based on the output from the delay profile generating section; and
- a quality measuring section configured to measure the quality of the output from the equalizing section and supply the resultant quality data to the analyzing section; wherein the plurality of correlating sections are configured with first and second correlating sections, normalizing a first correlation output from the first correlating section with respect to a second correlation output from the second correlating section.

18. The channel estimator according to claim 17, wherein the quality data is one of an S/N ratio and an error rate of demodulated data after the equalization process.

* * * * *